United States Patent [19]

Fustier

[11] Patent Number: 4,566,595
[45] Date of Patent: Jan. 28, 1986

[54] DEVICE FOR CLASSIFYING HANDLED OBJECTS

[76] Inventor: Guy Fustier, 5, rue de Reims, 94230 Cachan, France

[21] Appl. No.: 483,170

[22] Filed: Apr. 8, 1983

[30] Foreign Application Priority Data

Apr. 15, 1982 [FR] France .................................. 82 06480

[51] Int. Cl.[4] .......................... B07C 1/18; B07C 3/18
[52] U.S. Cl. .................................... 209/545; 209/564; 209/569; 209/584; 209/900; 271/65; 271/902; 364/478
[58] Field of Search ............... 209/540, 543, 545, 563, 209/564, 567, 569, 583, 584, 900; 270/58; 271/65, 186, DIG. 9, 902; 364/403, 478

[56] References Cited

U.S. PATENT DOCUMENTS

| | | | |
|---|---|---|---|
| 2,929,490 | 3/1960 | Stewart | 209/900 X |
| 2,988,216 | 6/1961 | Hayes et al. | 209/569 X |
| 3,007,572 | 11/1961 | Renshaw | 209/554 |
| 3,028,958 | 4/1962 | Pouliart et al. | 209/567 X |
| 3,378,251 | 4/1968 | Donabin | 271/186 X |
| 4,040,616 | 8/1977 | Clarkson et al. | 271/DIG. 9 X |
| 4,247,008 | 1/1981 | Dobbs | 209/569 |
| 4,388,994 | 6/1983 | Suda et al. | 209/564 |

Primary Examiner—Robert B. Reeves
Assistant Examiner—Edward M. Wacyra
Attorney, Agent, or Firm—Pearne, Gordon, Sessions, McCoy, Granger & Tilberry

[57] ABSTRACT

A device for classifying handled objects. This device comprises a mechanical sorting system and an electronic control system. The former comprises two storage devices, each organized in the form of a queue or line, i.e., the objects can be removed in the order in which they are entered, and a third storage device organized in the form of a stack or pile, i.e., the objects can be removed in the opposite order to that in which they entered. The mechanical system also comprises conveyors for transferring the objects between the different storage devices. The electronic system comprises a control computer, equipped with two memory zones organized in the form of a queue, and a third memory zone organized in the form of a stack, in which are stored the codes allocated to each object. The computer controls the transfer of codes from one memory zone to another, in order to sort in one of them the codes in a given order, and controls the corresponding displacement of the objects carrying the codes.

4 Claims, 5 Drawing Figures

DEVICE FOR CLASSIFYING HANDLED OBJECTS

BACKGROUND OF THE INVENTION

The present invention relates to a device for classifying handled objects. It can be used whenever it is wished to classify objects in accordance with the increasing or decreasing values of a code allocated thereto, said code representing various criteria, e.g. a destination. A preferred field of application for the invention is the classification of letters or cheques.

A process which is at present used for classifying objects consists of carrying out a cascade of successive sorting operations, starting with the least significant digits of the numerical code used for the classification.

Each sorting operation consists of separating the batch to be classified into N subunits, if the digit to which the sorting operation relates can assume N values. When the complete batch has been sorted on the basis of this digit, the N subunits are stacked in the order of the N values taken and the following sorting operation is carried out for the next most significant digit. The batch is completely classified on completing the successive sorting operations for all the digits.

This process involving successive sorting operations only represents a partly automatic solution to the classification problem. There are numerous intermediate handling operations, which must be carried out in strict order, because the slightest transposition during the taking up of the sorted batches makes it necessary to repeat the complete operation.

Moreover, the second sorting operation can only start when all the objects of the batch to be classified have been subject to the first sorting operation, which largely prevents any preparatory work, when the arrival of the objects to be classified is spread over a period of time.

SUMMARY OF THE INVENTION

The object of the present invention is to obviate these disadvantages by making it possible on the one hand to eliminate any repeat handling operation and manual classification of the content of sorting boxes, whilst on the other hand permitting the rapid incorporation of batches which have arrived after the already classified batches.

The invention therefore relates to a device essentially comprising a mechanical sorting system and an electronic control system, the former comprising two storage means organised in the form of a queue or line, i.e. the objects can be removed in the order in which they entered, and a storage means organised in the form of a stack or pile, i.e. able to remove the objects in the opposite order to that in which they entered. The first system also comprises means for transferring the objects between the different storage means. The electronic system essentially comprises a control computer, equipped with two memory zones organised in the form of a queue and a third memory zone organised in the form of a stack, in which are stored the codes allocated to each object. A fourth memory zone of the computer permits the dynamic storage of information indicating, for each of the objects stored in the first queue, whether there is any inversion in the order of classification of the codes, with respect to the object immediately following it in said queue. In this computer, means are provided for controlling the transfer of codes from one memory zone to another, in order to sort in one of them the codes in a given order and for controlling the corresponding displacement of the objects carrying said codes. The objects are finally sorted in a given order with respect to said code in the first storage means.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
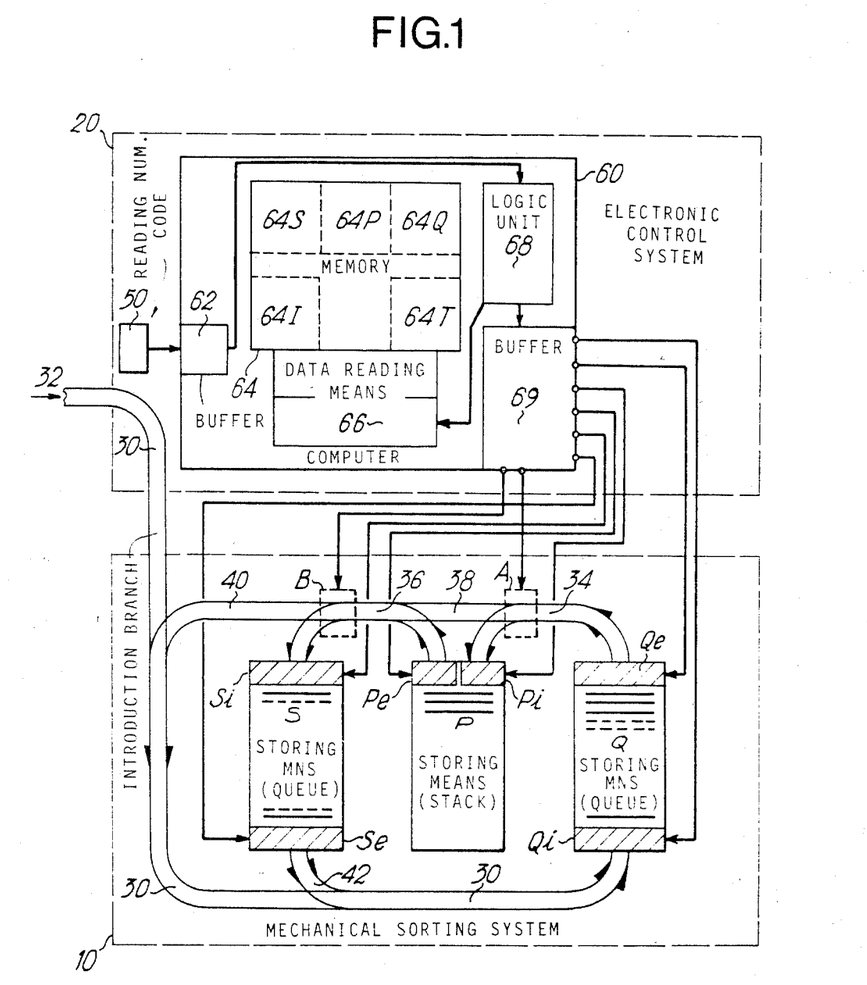
FIG. 1 a block diagram of the device according to the invention.

The device shown in FIG. 1 essentially comprises two parts, namely a mechanical sorting system 10 and an electronic control system 20. The mechanical sorting system 10 comprises:

(A) a first means for storing objects Q, organised in the form of a queue, i.e. enabling the objects to be removed in the order in which they enter, said means being consequently provided with a member $Q_i$ for introducing objects into the queue and a member $Q_e$ for extracting the first object from the queue;

(B) a second means for storing objects P, organised in the form of a stack, i.e. enabling the objects to be removed in the opposite order to that in which they entered, said means being consequently provided with a member $P_i$ for introducing an object onto the stack and a member $P_e$ for extracting an object from the stack;

(C) a third storage means for objects S, organised in the form of a queue, like the first, and being provided with an introduction member $S_i$ and an extraction member $S_e$;

(D) means for transferring the objects to be classified, comprising a certain number of branches and branch connections, namely an introduction branch 30 between an intake 32 and the introduction member $Q_i$ of the first storage means Q, a branch 34 between extraction member $Q_e$ of the first means and introduction member $P_i$ of the second storage means P, said branch having first switching means A, a branch 36 between the extraction member $P_e$ of the second storage means P and the introduction member $S_i$ of the third storage means S, said branch having a second switching means B, a branch 38 between the first switching means A and the second switching means B, a branch 40 connecting the second switching means B to introduction branch 30, a branch 42 connecting extraction member $S_e$ of the third storage means S to the introduction branch 30.

The electronic control system 20 comprises means 50 for reading a numerical code on the objects passing on the introduction branch 30 and a control computer 60 comprising:

(a) an input buffer circuit 62 connected to reading means 50;

(b) a memory 64 able to receive the codes of the different objects introduced into the sorting system, said memory more particularly comprising a first zone 64Q operating in the form of a queue in accordance with the first-in-first-out (FIFO) procedure, a second memory zone 64P operating in a stack according to the last-in-first-out (LIFO) procedure, a third memory zone 64S operating in the form of a queue, a fourth memory zone 64I in which is stored the information relating to the number and positions of code inversions for each of the objects loaded into storage means Q, and finally a fifth memory zone 64T containing instructions, the stored codes being arranged in the three memories 64Q, 64P and 64S in the same way as the objects are arranged in means Q, P and S respectively;

(c) a circuit 66 for reading the data and instructions stored in memory 64;

(d) a logic unit 68 performing programme instructions for processing data and arranging them in the memory;

(e) a buffer output circuit 69 connected to logic unit 68 and having eight outputs respectively connected to the object introduction members Qi, Pi, Si, to extraction members Qe, Pe, Se and to the two branching means A and B, said circuit supplying control signals able to then control the members in question.

Figure 2A:
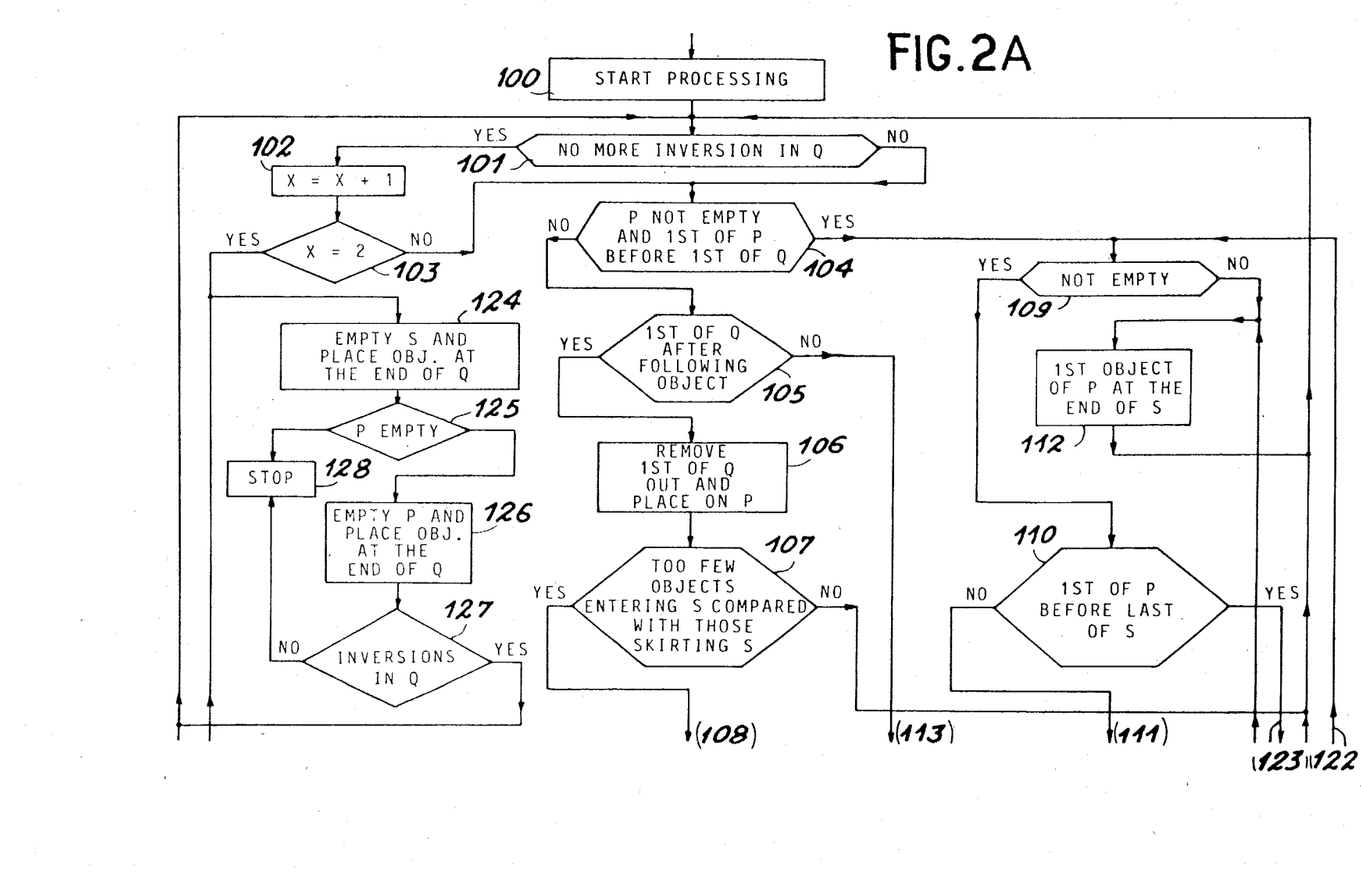
FIGS. 2A and 2B a diagram illustrating the sequence of operations performed.
Figure 2B:
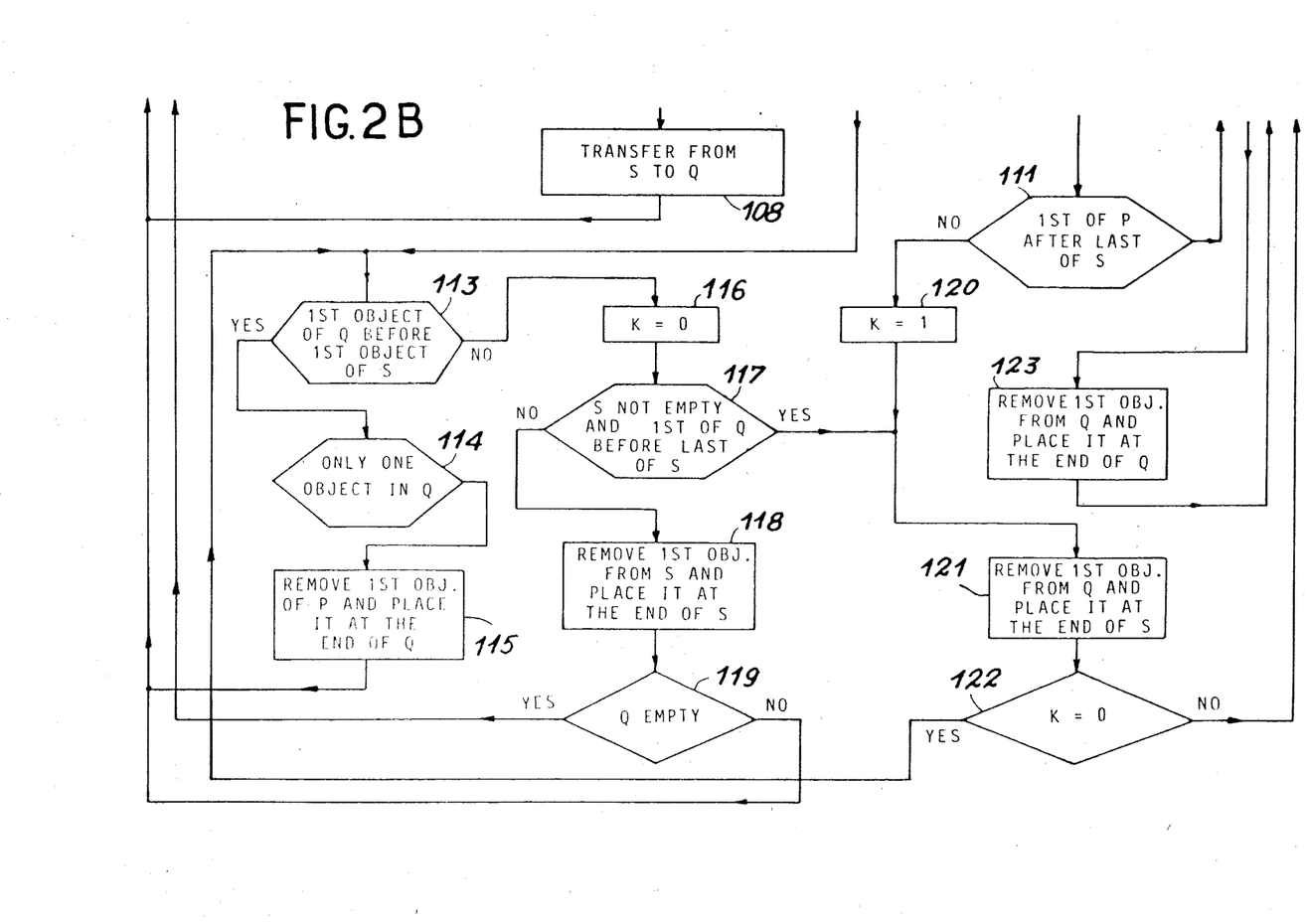

In order to explain the operation of this device, reference should be made to the diagram of FIGS. 2A and 2B, which gives the list of operations carried out and the order in which they are performed. A performance embodiment will now be given.

The treatment illustrated by the flow chart of FIGS. 2A and 2B comprises a sequence of interrogations (or proposals), whose content is drawn up in a rectangle having an input and two outputs, one being used in the case of an affirmative answer, the other in the case of a negative answer and a sequence of operations, whose content is drawn up in a rectangle having one input and one output. Each of the proposals and operations are referenced by a numerical reference.

More specifically, by its logic 68, the control computer is able to state whether the following proposals are true or false:

101: no more inversions in Q,
103: an auxiliary variable X is equal to 2,
104: P is not empty and the first object of P is classified before the first object of Q,
105: the first object of Q is classified after the following object,
107: there are too few objects entering S compared with those skirting S,
109: S is not empty,
110: the first object of P is classified before the first object of S,
111: the first object of P is classified after the last object of S,
113: the first object of Q is classified before the first object of S,
114: there is only one object in Q,
117: S is not empty and the first object of Q is classified before the last object of S,
119: Q is empty.

The computer is also able to control the following operations:

100: commence processing,
102: give to a variable X the value 0, if proposal 101 is false and increment X by one unit if the proposal is true,
106: remove the first object from Q and place on P,
112: place the first object of P at the end of S,
115: remove the first object from Q and place it at the end of Q,
116: give the value 0 to a variable K,
118: remove the first object from Q and place it at the end of S,
120: give the value 1 to the variable K
121: remove the first object from S and place it at the end of Q,
123: remove the first object from P and place it at the end of Q,
124: empty S and arrange the objects at the end of Q,
128: stop processing.

In these operations, the appearance of two auxiliary variables X and K should be noted. The first is used for following the evolution of the number of inversions in queue Q. When there are inversions in this queue, X is maintained at zero. On the first occasion when Q contains no more inversions, X is brought to 1. However, this does not end the treatment or processing, because there are still objects and P and S and there could be inversions in the regrouping of objects in Q. Thus, it is only after it has been established a second time that there are no longer any inversions in Q, that it is possible to pass X to 2, making it possible to continue up to the end of processing (operations 124, 125, 128).

The auxiliary variable K is used for controlling switching means 122, which is involved after operation 121, which consists of removing the first object from S to place it at the end of Q. This variable makes it possible to know if the operation in question takes place after operation 113 or after operation 111.

Operation 107 serves to prevent the blocking of queue S. Thus, if a high rank object is classified at the top of S, very few other objects could then be placed behind said object, so that most of the objects would skirt means S by branch 30. The computer then evaluates the percentage of objects skirting S compared with those arranged in S. When this percentage assumes what is considered to be an excessive value, i.e. when too few objects enter S, objects are transferred from S into Q (operation 108), which empties S and then permits its reuse under better conditions. The limit which must not be exceeded depends on the operation taking place. Thus, for example, it is possible to calculate the quotient of the difference between the number of objects skirting S and the number of objects entering S and decide that when said quotient exceeds e.g. 2, too few objects enter S, so that the latter will be emptied.

By means of numerical data transfers from one memory zone to another, computer 60 is then able to arrange said data in the first memory zone 64Q and in a predetermined order, e.g. in increasing order. Concomitantly, the computer supplies signals able to transfer the objects having said codes from one storage means to another, in such a way that at the end of processing, objects classified in the chosen order are located in the first storage means Q. To a certain extent, the state of the system 10 is at all times recorded in the memory of the computer, the latter having the function of classifying the information which it contains and consequently control the state of the classifying system.

To better illustrate the operation of the device according to the invention, an example will now be described. This has been voluntarily simplified in the sense that it corresponds to the classification of a small number of objects, but the passage to a larger number is immediate. In this example, the objects will be identified by a four-digit code and it is a question of classifying these objects in the rising order to said code.

The initial state is defined by the following sequence of objects:

8684/7859/3730,6633/6425,7754,8810, 9168,9580/2258

The oblique lines separate groups of objects within which the objects have already been classified correctly, which may result from an earlier classification operation. Thus, these lines indicate that there is an inversion in the order of classification between the two adjacent terms. The problem consists of arranging all these 10 objects in the rising order of their code in order to obtain the following classified sequence:

2258,3730,6425,6633,7754,7859,8684,8810,9168,9580.

The various stages of the process are indicated hereinafter. The controls carried out are given for each new operation, as well as the successive states of the queues (in Q and in S) and of the stack (in P):
INITIAL QUEUE;
8684/7859/3730 6633/6425 7754 8810 9168 9580/2258
CONTROLS:
SWITCHING MEANS B INOPERATIVE, SWITCHING MEANS A OPERATING, EXTRACTION FROM Q, STACKING INTO P
NEW QUEUE:
7859/3730 6633/6425 7754 8810 9168 9580/2258
NEW STACK:
8684
CONTROLS:
SWITCHING MEANS B INOPERATIVE, SWITCHING MEANS A OPERATING, EXTRACTION FROM Q, STACKING IN P
NEW QUEUE:
3730 6633/6425 7754 8810 9168 9580/2258
NEW STACK:
7859 8684
CONTROLS:
SWITCHING MEANS A INOPERATIVE, SWITCHING MEANS B OPERATING, EXTRACTION FROM QUEUE, ENTRY INTO S
NEW QUEUE:
6633/6425 7754 8810 9168 9580/2258
NEW STACK:
3730
CONTROLS:
SWITCHING MEANS B INOPERATIVE, SWITCHING MEANS A OPERATING, EXTRACTION FROM Q, STACKING IN P.
NEW QUEUE:
6425 7754 8810 9168 9580/2258
NEW STACK:
6633 7859 8684.
CONTROLS:
SWITCHING MEANS A INOPERATIVE, SWITCHINGMEANS B OPERATING, EXTRACTION FROM Q, ENTRY INTO S
NEW QUEUE:
7754 8810 9168 9580/2258
NEW STACK:
3730 6425
CONTROLS:
SWITCHING MEANS A INOPERATIVE, SWITCHING MEANS B OPERATING, UNSTACKING FROM P, ENTRY INTO S
NEW STACK:
7859 8684
NEW STACK:
3730 6425 6633
CONTROLS:
SWITCHING MEANS A INOPERATIVE, SWITCHING MEANS B OPERATING, EXTRACTION FROM Q, ENTRY INTO S
NEW QUEUE:
8810 9168 9580/2258
NEW STACK:
3730 6425 6633 7754
CONTROLS:
SWITCHING MEANS B OPERATING, SWITCHING MEANS A INOPERATIVE, UNSTACKING FROM P, ENTRY INTO S
NEW STACK:
8684
NEW STACK:
3730 6425 6633 7754 7859
CONTROLS:
SWITCHING MEANS A INOPERATIVE, SWITCHING MEANS B OPERATING, UNSTACKING FROM P, ENTRY INTO S.
NEW STACK:
0
NEW STACK:
3730 6425 6633 7754 7859 8684
CONTROLS:
SWITCHING MEANS A INOPERATIVE, SWITCHING MEANS B OPERATING, EXTRACTION FROM Q, ENTRY INTO S
NEW QUEUE:
9168 9580/2258
NEW STACK:
3730 6425 6633 7754 7859 8684 8810
CONTROLS:
SWITCHING MEANS A INOPERATIVE, SWITCHING MEANS B OPERATING, EXTRACTION FROM Q, ENTRY INTO S
NEW QUEUE:
9580/2259
NEW STACK:
3730 6425 6633 7754 7859 8684 8810 9168
CONTROLS:
SWITCHING MEANS B INOPERATIVE, SWITCHING MEANS A OPERATING, EXTRACTION FROM Q, STACKING INTO P.
NEW QUEUE:
2258
NEW STACK:
9580
CONTROLS:
EXTRACT FROM S, STACK INTO Q, 8 TIMES; S IS EMPTY
NEW QUEUE:
2258 3730 6425 6633 7754 7859 8684 8810 9168
CONTROLS:
SWITCHING MEANS B INOPERATIVE, ENTRY INTO Q, EXTRACTION FROM P.
THE STACK IS EMPTY.
FINAL QUEUE:
2258 3730 6425 6633 7754 7859 8684 8810 9168 9580
Classification is at an end.

Figure 3:
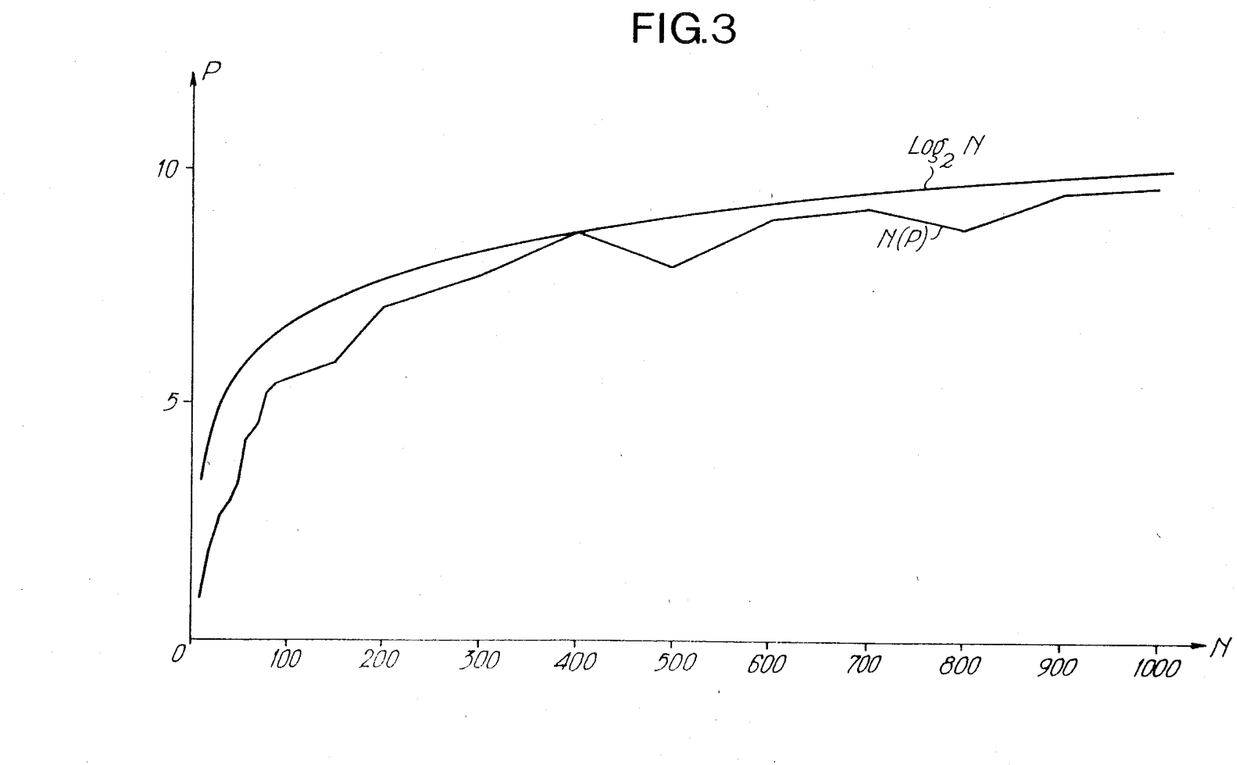
FIG. 3 a graph showing the evolution of the number of passages of objects in the device, as a function of the number of objects to be classified.

In general terms, the Applicant has calculated the average number of passages P of objects in classification systems, as a function of the number of objects to be processed N. The variations of this function are represented in FIG. 3 by the broken curve N(P). It can be seen that this curve is positioned slightly below the curve of variations of the logarithm to base 2 of the number of objects ($\log_2 N$).

It should be noted that the number of passages is relatively low (remaining below 10 for 1000 objects), which shows the effectiveness of the processing carried out.

The above description applies no matter what the nature of the objects to be classified. For example, they can consist of food products, parcels, spares, etc. However, a preferred field of the application is to be the processing of postal items, which have to be classified as a function of the distribution points.

In order to carry out a classification of letters, the address of the addressee is firstly translated into a classification code, generally printed in the form of fluorescent strips on the envelope. This classification code makes it possible to classify the flow of post in the order of the round used by postmen at the time of distribution. This code allocates a rank to each letter, said rank being dependent on the order of the delivery points of the post or mail. Thus, the classification to be established is a topological classification in that it refers to the postman's round.

Figure 4:
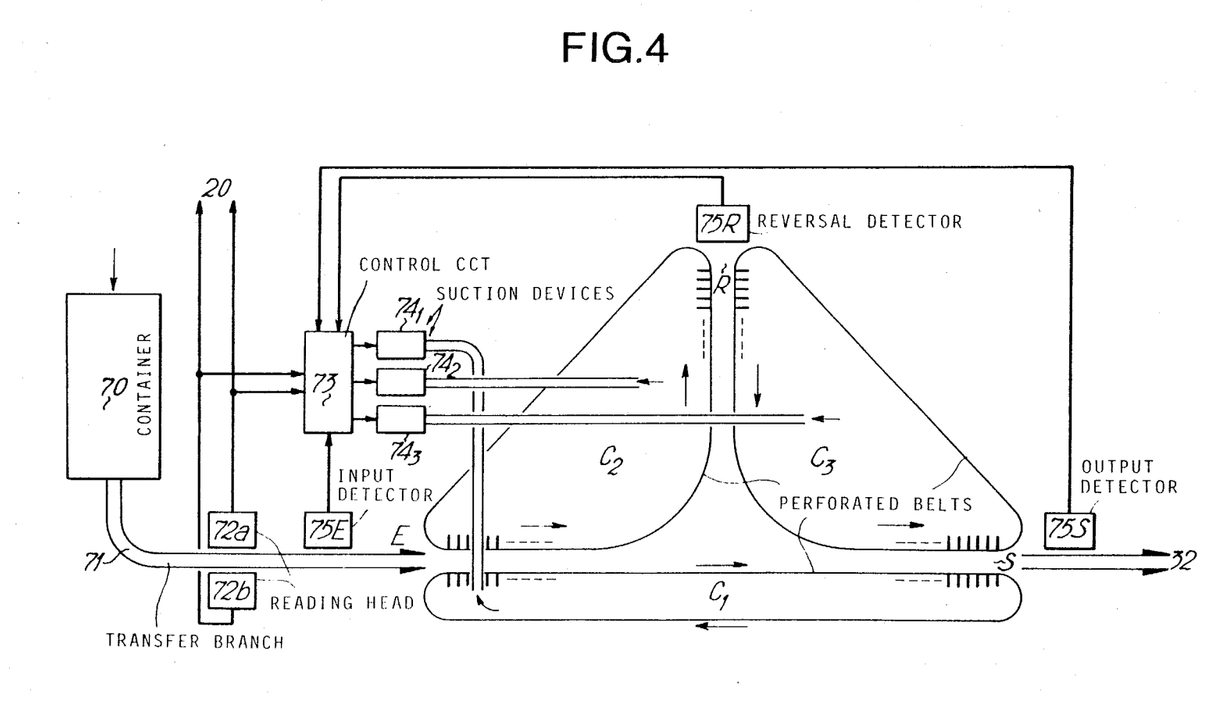
FIG. 4 an intake device, equipped with means for turning round or over the letters.

In this application, the storage means Q, P, S are containers able to receive the letters and form lines organised either in the form of queues (Q and S), or in the form of a stack (P). Moreover, in this particular application, a somewhat special entry device can be used if it is desired to be able to turn round or turn over certain letters which appear the wrong way up or the wrong way round, their upper and lower edges being correctly oriented, so that it is the front and rear edges which are reversed, in the displacement of these letters in their plane, in the direction given by their upper and lower edges. Thus, the indexing of the envelope is the wrong way up for one of the two reading heads and the identification logic must take account of this fact. This device is illustrated in FIG. 4.

This device comprises a manually loaded container 70, a transfer part 71, a double reading head $72a$, $72b$ able to read the code materialised by the fluorescent strips on the envelopes, a control circuit 73 connected to the double reading head and finally a turning device. The latter means comprises three permanently rotating perforated belts $C_1$, $C_2$, $C_3$, which leave between them three channels. Three suction devices $74_1$, $74_2$, $74_3$ issue into the area defined by each belt. Openings are made along the three channels in the hatched areas of FIG. 4, thus producing a suction action through the perforations of the belts.

The rotation direction of the belts is such that for one of the channels (the vertical channel in FIG. 4), the facing belts $C_2$, $C_3$ move in opposite directions. For the two other channels, belts $C_1$, $C_2$, $C_3$ move in the same direction.

The turning device is completed by three detectors located at entry E, exit S and reversal point R, i.e. respectively 75E, 75S and 75R. These three detectors are connected to the control logic 73.

Circuit 73 is able to control one of the suction devices $74_1$, $74_2$, $74_3$ at a time in order to bring about a suction through the perforations of the corresponding belt. A letter in the vicinity of said belt is then applied against the latter. The turning of a letter is obtained by the successive control of two belts rotating in opposite directions ($C_2$ and $C_3$), which firstly engages the letter against $C_2$ and then against $C_3$.

The double reading heads $72a$, $72b$ makes it possible to determine where the fluorescent strips of the introduced letter are located and to establish whether the letter has or has not been turned. If the letter is in the correct direction, reading head $72a$ is put into operation and logic 73 controls suction device $74_1$ on belt $C_1$. The letter takes the channel left between $C_1$ and $C_2$ and then between $C_1$ and $C_3$. Its passage at entry E and at exit S is noted by detectors 75E and 75S.

If the letter is introduced the wrong way up, reader $72b$ is put into operation and control logic 73 controls suction device $74_2$ on belt $C_2$. When the letter arrives at end R, detector 75R indicates this, device $74_2$ is stopped and device $74_3$ started up. The letter is then sucked against belt $C_3$ and travels towards exist S, where it is turned round with respect to its entry position.

In such an embodiment, the double reading head $72a$, $72b$ constitutes the reading device 50 of FIG. 1, because it supplies the information making it possible to identify the object to be classified.

Finally, it should be noted that the device described hereinbefore can be used in a sorting machine. As the batch of post to be processed is classified according to a rising order of indexes carried by the envelopes, it is very easy to perform a completely arbitrary number of separations in this post, by simply inserting, at the same time as the letters, brightly coloured paper inserts, which can easily be detected in container Q at the end of processing.

These inserts, which carry "boundary" indexes, not used by the addressing postal organisation, can be added at the last moment in a single passage. In the case of cascade sorting operation, these inserts can be added to the batch at the start of processing.

It is then possible to consider these inserts as the walls of the reception boxes or compartments of a sorting machine. Thus, a sorting machine is obtained with a completely random number of boxes and whose volume varies with the post or mail to be received. Such a machine is instantaneously adaptable with regards to the number and volume of separations. In addition, it has much smaller overall dimensions than existing sorting machines and requires far fewer manipulations for its use.

It can also be stressed that in destination sorting, the classification carried out the by first centralizer within the batches which he despatches, assists the receiving centralizers, by accelerating their own sorting and classifying work. In particular, the sorting and classification work is considerably accelerated by placing the wrong way up in the entry container each first series of a batch of three in order to utilize to the maximum the stack of the machine.

What is claimed is:

1. A device for classifying objects, wherein it comprises a mechanical classification system and an electronic control system, the classification system comprising:
    (A) a first means for the storage of objects, organised in the form of a queue, i.e. enabling the objects to be removed in the order in which they entered, said means being provided for this purpose with a member for introducing the objects into the queue and a member for extracting the first object from the queue;

(B) a second means for the storage of objects, organised in the form of a stack, i.e. enabling the objects to be removed in the opposite order from that in which they were inserted, said means being consequently provided with a member for introducing objects to the stack and member for extracting the first object from the stack;

(C) a third means for storing objects, organised in a queue, i.e. able to remove the objects in the order in which they entered, said means being provided for this purpose with a member for introducing the objects into the queue and a member for extracting the first object from the queue;

(D) means for conveying the objects to be classified, comprising an introduction branch located between an intake and the introduction member in the first storage means, a branch between the extraction member of the first means and the introduction member of the second storage means, said branch having first switching means, a branch between the extraction member of the second storage means and the introduction member of the third storage means, said branch having a second switching means, a branch between the first switching means and the second switching means, a branch between the second switching means and the introduction branch, a branch between the extraction member of the third storage means and the introduction branch, and wherein the electronic control system comprises:

(E) means for reading a numerical code on the object passing on the introduction branch, (F) a control computer comprising:
  (a) a buffer input circuit connected to the reading means
  (b) a memory able to receive the codes of the different objects introduced into the classification system, said memory comprising a first zone operating in a queue in accordance with the first-in-first-out procedure, a second zone operating in a stack according to the last-in-first-out procedure, a third zone functioning as a queue, a fourth memory zone in which is stored information indicating whether there is an inversion of each code with respect to the code immediately following and a fifth zone comprising instructions, the stored codes being arranged in the first, second and third memory zones in the same way as the processed objects are respectively arranged in the first, second and third storage means;
  (c) a circuit for reading the data and instructions stored in the memory;
  (d) a logic unit performing instructions and able to control the transfer of codes from one memory zone to another in order to classify the codes in a given order in the first memory zone and for supplying control instructions able to displace the objects corresponding to said codes from one storage means to another in order to finally obtain, in the first storage means, the objects classified in the desired order;
  (e) an output buffer circuit connected to the logic unit and having 8 outputs connected to the introduction members, to the extraction members and to the two switching means.

2. A device according to claim 1, wherein the logic unit of the computer is able to state whether at least one of the following proposals is true or false:
  101: no more inversions in Q,
  103: an auxiliary variable X is equal to 2,
  104: P is not empty and the first object of P is classified before the first object of Q,
  105: the first object of Q is classified after the following object,
  107: there are too few objects entering S compared with those skirting S,
  109: S is not empty,
  110: the first object of P is classified before the first object of S,
  111: the first object of P is classified after the last object of S,
  113: the first object of Q is classified before the first object of S,
  114: there is only one object in Q,
  117: S is not empty and the first object of Q is classified before the last object of S,
  119: Q is empty.

3. A device according to claim 2, wherein the logic unit of the computer is able to control at least one of the following operations:
  100: commence processing,
  102: give to a variable X the value 0, if proposal 102 is false and increment X by one unit if the proposal is true,
  106: remove the first object from Q and place on P,
  112: place the first object of P at the end of S,
  115: remove the first object from P and place it at the end of Q,
  116: give the value 0 to a variable K,
  118: remove the first object from Q and place it at the end of S,
  120: give the value 1 to the variable K
  121: remove the first object from S and place it at the end of Q,
  123: remove the first object from P and place it at the end of Q,
  124: empty S and arrange the objects at the end of Q,
  128: stop processing.

4. A device according to claim 1, wherein the objects to be classified are letters, so that it also comprises a turning over or round device incorporating three permanently rotating perforated belts leaving between them three channels, each belt being provided with a suction device operating through perforations made along the three channels, the rotation directions of the belts being such that for one of the channels, the facing belts move in opposite directions, whilst for the two other channels, the belts move in the same direction, the device also comprising a logic member able to control the suction devices one at a time, in order to bring about a suction operation and the application of a letter against the corresponding belt, the turning of a letter being obtained by the successive control of two belts rotating in opposite directions.

* * * * *